US00H002105H

(19) United States

(12) Statutory Invention Registration

Pinto

(10) Reg. No.: US H2105 H

(43) Published: Jun. 1, 2004

(54) METHOD AND APPARATUS FORMING A FIBER WEB

(76) Inventor: Akiva Pinto, Narciss Str. 9A-23, 92461 Jerusalem (IL)

(21) Appl. No.: 10/242,126

(22) Filed: Sep. 12, 2002

(51) Int. Cl.[7] ..... D01G 15/02

(52) U.S. Cl. ..... 19/105

(58) Field of Search ..... 19/65 A, 92, 97, 19/90, 97.5, 98, 100, 105, 106 R, 145.5, 145.7, 161.1, 200, 203, 204, 205, 225, 300, 302, 303, 304

*Primary Examiner*—Michael J. Carone
*Assistant Examiner*—M. Thompson
(74) *Attorney, Agent, or Firm*—McNair Law Firm, P.A.

(57) ABSTRACT

A fiber web forming apparatus which utilizes a fiber mixing chamber which in operation receives fibers from a plurality of sources along with a chemical agent, generally a bonding agent. The mixing chamber acts to further open and blend the fibers and also to blend the chemical agent with the fibers before the forming of the fiber web.

1 Claim, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD AND APPARATUS FORMING A FIBER WEB

BACKGROUND OF THE INVENTION

The instant invention is directed to a fiber web forming apparatus which includes an arrangement for delivering chemical agents, preferably in powder form, into the fiber mixing chamber.

SUMMARY OF THE INVENTION

The instant arrangement is for forming a stable fiber web having high loft and high resilience. The arrangement includes a cabinet receiving opened and blended fibers and a fiber web forming chute which receives the opened and blended fibers from the cabinet. The forming chute including a first and second wall with fiber contacting elements which engage the fibers and assist in urging them through the fiber forming chute and out its exit in an evenly distributed condition forming a fiber web. The fiber contacting elements include a fiber inter-engaging device associated with at least one of the first and second walls. The inter-engaging device acts on at least the outer fibers adjacent to at least one of the first and second walls to cause these fibers to inter-engage creating a stable outer surface on the fiber web being formed. A fiber web so constructed will better maintain its formed configuration during transport to further processing.

The fiber inter-engaging device may comprise a heating element which when contacting the outer fibers causes adjacent ones to fuse together. There may be a pair of these heating rolls located adjacent the exit in opposing relationship.

The fiber inter-engaging device is formed as at least a portion of the first and second walls.

The fiber inter-engaging device may comprise a needle bed or a pair of opposed needle beds which operate within the chute along at least one of the first and second walls.

The arrangement may include an air distribution system which delivers an air flow into the fiber-forming chute for assisting in the distribution and movement of the fibers within the forming chute. A distributor may be associated with the air distribution system which is operative to add chemical agents to the air flow for distribution throughout the fibers during formation of the fiber web.

Alternatively, the arrangement may include a distributor for adding the chemicals to a feed chute above the mixing chamber. In this arrangement, the beater roll acts to throw the fibers into the chemical agent being fed into the mixing chamber by a feed roll. The distribution in this arrangement may include a chemical agent supply, a delivery belt and a vertical feed chute.

The arrangement may include a conveyor system adjacent the chute exit. The fiber inter-engaging device may be arranged to be adjacent one end of the conveyor system. The fiber inter-engaging system may comprise a heating member for heating at the outer fibers of the fiber web passing over the conveyor causing adjacent fibers to fuse. The heating member may comprise a pair of heating rolls.

The fiber-contacting element may include a packing belt which forms at least a part of one of the first and second walls. Also, the fiber-contacting element may include a vibrating plate forming at least a part of one of the first and second walls. There may be a compression roll adjacent the exit which is heated. The heated compressor roll acts to compress and to fuse the outer fibers of the fiber web.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
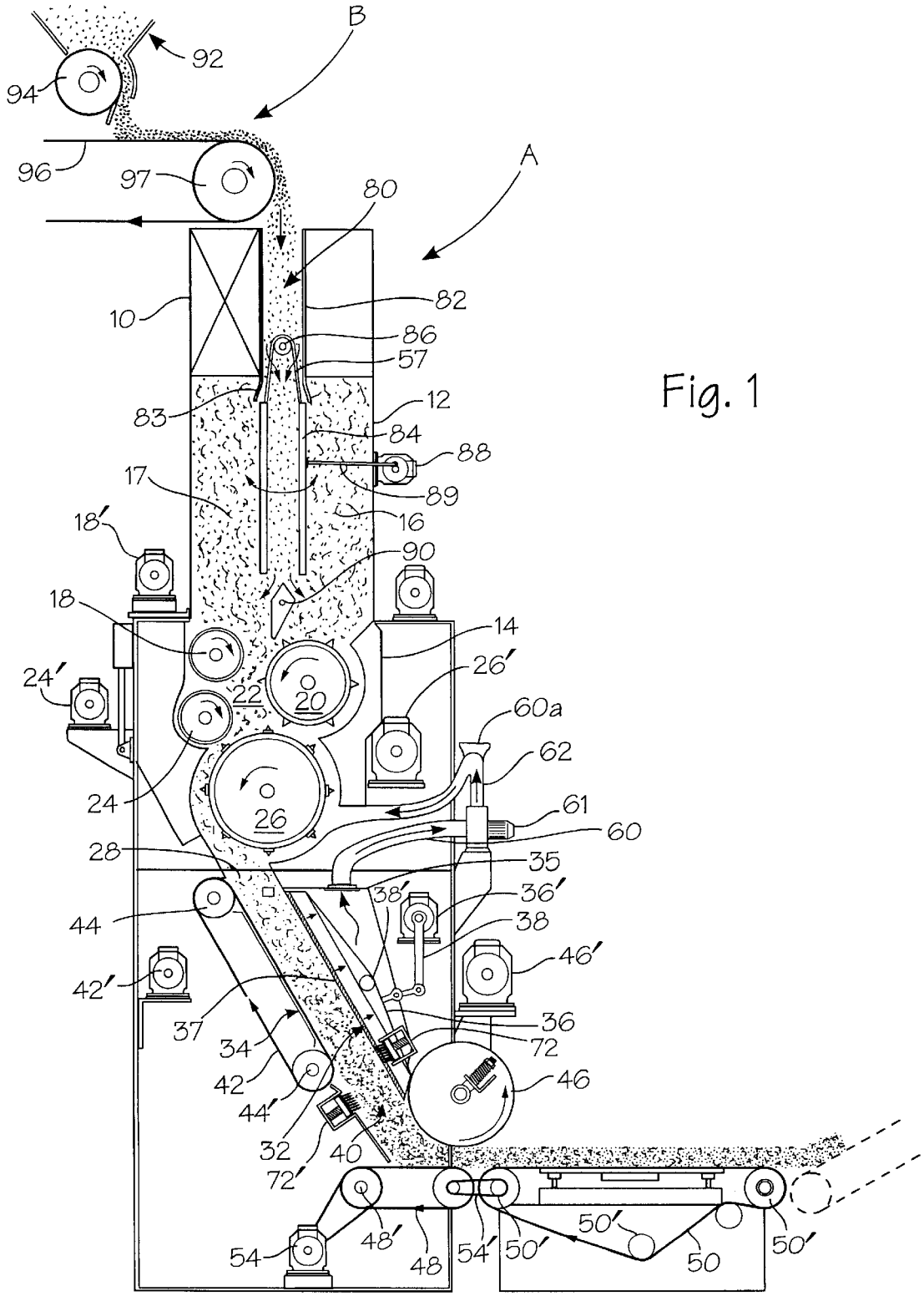
FIG. 1 is a cutaway side view of a preferred arrangement of the fiber web-forming device.

Turning now to the drawing, in FIG. 1 shows apparatus for transforming fibers into a non-woven fiber web or fabric. The system begins with a fiber feed system substantially as disclosed in co-pending applications Ser. No. 09/760,925 and 09/505,922, now U.S. Pat. Nos. 6,276,028 and 6,263,545, which may include carding machines of any known type which may be arranged side by side or in parallel. The fibers fed through each machine may be maintained separated during this phase of the operation. It is noted that other types of fiber opening apparatus, such as air lay openers, may be substituted for the carding machines.

Doffers, such as roll doffers or air doffers, are connected with doffing machines to withdraw the carded fibers from the carding roll and deposit them onto a transport. It is noted that it is preferred both doffers be of the same type, however, this is not necessary.

The transports deliver the carded and doffed fibers into a reserve supply which acts to further blend the fibers and also to provide a constant supply of fibers for the next phase of the operation. Transports deliver the fibers from the reserve supplies to respective of feed chutes 10, 12 in the manner described in the afore referred to parent applications.

The transports may be in the form of conveyor belts or they may be in the form of air ducts. Fans may be provided to generate the air current to carry the fibers through the transports.

Fiber feed chutes 10, 12 are connected with housing 14 which is formed within a cabinet.

Fiber discharge openings 16, 17 are arranged in the upper surface of housing 14. Feed roll 18 is located adjacent opening 17 and rotates in a clockwise direction. Feed roll 20 is located adjacent opening 16 and rotates in a counter clockwise direction. Preferably, the diameter of feed roll 18, which is about 6 inches in diameter, is about half the diameter of feed roll 20.

Feed rolls 18 and 20 are driven by independent drive motors 18', 20' which are each controlled to selectively drive the feed rolls at selected RPM's. The speed selected is determined by sensors which usually control feed rolls 18 and 20 to have the same peripheral speed. A median peripheral speed for feed rolls 18 and 20 is between 0 and 20 m/min. In cases where the mixture of fibers from chutes 10 and 12 is to be unequal, the relative peripheral speed between rolls 18 and 20 is adjusted to obtain the desired mixture.

The feed rolls deliver the fibers into mixing chamber 22 where they are further opened and blended. At the lower end of mixing chamber 22 there is located a combing roll 24 and a beater roll 26. Combing roll 24 along with feed roll 20 act to pick up fibers in the mixing chamber and wipe them onto the outer surface of beater roll 26. The beater roll in turn acts to further open and blend the fibers as they are moved through the beater chamber during delivery into receiving end 28 of the forming chute.

Comber roll 24 and beater roll 26 are driven by motors 24' and 26' at selected speeds. The selected speed chosen for each of rolls 18, 20, and 26 is determined by the fiber blend desired and by the fiber volume necessary to form the fiber batt or non-woven fabric at the desired density and weight in the forming chute.

The forming chute is of usual rectangular shape with an upper wall 32 and a lower wall 34 spaced by a pair of equal sized sides. Upper wall 32 includes a housing 35, one side of which comprises vibrating plate 36. Vibrating plate 36 extends across the width of upper wall 32 and lengthwise of the forming chute from adjacent the upper end of wall 32 to adjacent upper end portion 33 at the lower end of the forming chute. Upper end portion 33 forms the upper surface adjacent discharge or delivery end 40 of the batt-forming chute. Vibrating plate 36 is driven in a rocking motion about pivot 38' by motor 36' through linkage 38. The structure of chute 30 is maintained by vibrating plate 36 remaining a relatively constant position relative to lower wall 34.

Hood 35 has connected with the side wall remote the forming chute a conduit 60 which connects with blower or fan 61. A second conduit 62 connects blower 61 with housing 14 and mixing chamber 22. Lower surface 37 of vibrating plate 36 is perforated as indicated by the arrows. This structure allows blower 61 to force air in the direction of the arrows creating the following scenario.

An air flow may be forced through conduit 62 into mixing chamber 22. The velocity of the air flow is lower than the velocity of beater roll 26 and plays no significant roll in moving the blended and opened fibers through receiving end 28 of the forming chute. As the air flow moves through the forming chute it acts to move or urge the fibers toward the upper side of the chute which assist in more evenly distributing the fibers preventing compacting toward the lower area of the web adjacent chute wall 34 by the movement of packing belt 42. The air flow further helps to maintain the fibers oriented in all directions which provides for greater stability for the fiber web.

As the air flow moves down the forming chute it is drawn through the openings in upper wall 32 and vibrating plate 36 and into hood 35. From the housing the air is circulated back to blower 61 through conduit 60 where the cycle is repeated.

The velocity of the air flow is preferably lower than the fiber velocity created by beater 26 with preferred velocity lower than 1 meter/second and the pressure of the air flow is between 1–50 millimeters water gauge.

A second chemical agent distributing system is shown as distributing system A may be operated in combination with distributor 60*a* or it may be operated in lieu of distributor 60*a*. Distributing system A comprises a channel 80 which is located between fiber feed chutes 10 and 12. Channel 80 is preferably divided between an upper shaft 82, formed with stationary vertical walls, and lower shaft 84, pivotally carried by rod 86. It is understood that both upper and lower shafts 84, 86 are comprised of four walls forming a generally rectangularly shaped opening which extends across the width of the mixing chamber 22.

Preferably lower shaft 84 is held in a position below outwardly beveled lower ends 83 of upper shaft 82 by a plurality of support wires 57. Each support wire passes over rod 86 with its opposite ends connected with the upper ends of lower shaft 84.

Motor 88 connects with lower shaft 84 by way of crank 89. A guide 90 is adjustably positioned below the exit end of lower shaft 84. Guide 90 acts to direct the chemical agents evenly over the mixing chamber 22 to facilitate an even intermingling with the fibers being opened and blended in the mixing chamber.

The chemical agent, here identified as B, is preferably delivered from supply bin or unit 92 by means of feed roll 94 onto rotating belt 96. Belt 96 passes over pulley 97 which is arranged adjacent the upper opening of channel 80. The arrangement allows for the inclusion of an indeterminate number of supply bins 92 to accommodate blending of selected chemical agents in selected amounts before delivery into channel 80. Also, the total volume of chemical agent can be controlled by controlling the speed of feed roll 94 and/or belt 96. In operation, chemical agent B is delivered into channel 80. Motor 88 operates crank 89 to oscillate lower shaft 54 along the path indicated by the arrow. The chemical agent falls freely through channel 50 and flows evenly into and throughout mixing chamber 22.

By rocking lower shaft 84, it is assured that there will not develop a build up of the chemical agent in channel 80 which could create an uneven distribution.

It is noted that the chemical agent distributing system A while described as operating with a fiber web forming apparatus which utilizes an air flow system as described, it is equally suitable for use with a fiber web forming apparatus such as disclosed in U.S. Pat. No. 6,263,545 or any other gravity feed fiber web forming apparatus.

Another obvious alternative to the above described arrangement would be to supply fibers to only one of the two supply chutes 10, 12 and adapting the other of the supply chutes to receive the chemical agent B from a suitable delivery such as rotating belt 96. This alternative system would now function much the same as distribution system A with the chemical agent falling down the selected chute 10, 11 and into mixing chamber 22 to be thoroughly blended with fibers therein.

Lower wall 34 carries packing belt 42, which covers substantially its entire area terminating just short of delivery end 40 adjacent lower end portion 35. Packing belt 42 which is continuous, passes around roller 44 which is arranged near the upper end of lower wall 34 and around the roller 44' which is arranged adjacent lower end portion 35 near delivery end 40 of the batt forming chute. Motor 42' drives roller 44 and packing belt 42 in a clockwise direction. The packing belt acts along with the just described air flow to physically assist the movement of the fibers from receiving end 28 down the forming chute forming the fiber web or non-woven fabric fibers. The air flow may, if desired, also act to physically treat the fibers with powdered chemical agents such as adhering agents anti-static agents, etc. The fiber orientations are more evenly maintained throughout the batt-forming chute. Also, the fiber density throughout the fiber web is more evenly maintained between the bottom and top surfaces of the fiber web.

A preferred arrangement of the fiber web forming system includes a needle bed 72, 72' carried by upper and lower end portions adjacent to delivery end 40. Each needle bed 72, 72' is of usual construction and is formed to extend across the entire width of forming chute 30. Each needle bed 72, 72' includes needles, which are driven in the usual reciprocating manner to pass through upper and lower end portions and into portions of the forming chute 30. The interaction of the needles with the fibers of the fiber web adjacent the upper and lower walls causes the fibers to inter-engage or entangle forming more stable upper and lower outer surfaces of the fiber web passing out delivery end 40. These more stable outer surfaces create a more stable fiber web. It is noted that in certain circumstances only one needle bed may be employed.

Compression roll 46, which is driven by motor 46', acts to compress and draw the formed fiber batt out of delivery end 40 of the batt-forming chute.

It is the combined operations of vibrating plate 36 and packing belt 42 which draw and urge sufficient quantities of fibers toward delivery end 40. The fiber volume can be controlled by the speed of the vibrator plate, the air velocity, and the speed of the packing belt. Compressor roll 46 acts on the formed fiber web to compact it to a desired height providing a non-woven fabric or fiber web with desired entanglement, body, weight, and height.

A conveyor belt 48, arranged adjacent delivery end 40, receives the fiber web emerging from the delivery end. Conveyor belt 48, which passes around rollers 48', acts as a back wall against the force exerted by compression roll 46 and further acts as a delivery belt for moving the formed fiber web onto conveyor belt 50.

Conveyor belt 50 passes about rollers 50'. Motor 54 which is connected with a roller 48' also drives conveyor belt 50 through drive belt 54'.

Mounted intermediate rollers 50 is a scale which acts to weigh the fiber batt emerging from delivery end 40 as it is moved over conveyor belt 50. The weight of the formed fiber web or non-woven fabric is sent to a control which calculates its density and compares this density to a norm. The operation of compressor roll 46, conveyor belts 48, along with the scale and control are fully described in co-pending application with Ser. No. 09/505,922.

It is noted that while the description has been limited to heating rolls, any other known type of heating unit could be used, i.e. infrared and resistor.

The arrangements described above are capable of receiving and providing a supply of carded, opened, and blended fibers to the fiber web or non-woven fabric forming machine at controlled rates and at controlled machine speed. The arrangement provides for an increased rate in production of non-woven webs of selected weights, densities, and heights. The fibers are more evenly blended with the fiber directions oriented in all directions, and the chemical agent is more uniformly mixed with the fibers providing for a more stable, more sturdy, and more resilient product. The fibers are also more evenly bonded due to a more thorough and even distribution of the chemical agent.

The systems are ideal for preparing fibers which are all natural, all synthetic, or blends of natural and synthetic. Also, the fibers may be virgin fibers or regenerated fibers.

While preferred arrangements of the invention has been described using specific terms, such description is for illustrative purposes only, and it is to be understood that changes and variations may be made without departing from the spirit or scope of the following claims.

What is claimed is:

1. In a fiber web forming apparatus having at least one vertically disposed fiber feed chute feeding fibers into a mixing chamber, a fiber web forming chute, and a chemical agent distribution system comprising:

a supply unit for said chemical agent;

a chemical agent feed chute opening into said mixing chamber, said chemical agent feed chute being vertically disposed and arranged adjacent said at least one fiber feed chute, said chemical agent feed chute including an upper shaft and a lower shaft;

a feed for receiving said chemical agent from said supply unit and delivering said chemical agent into said chemical agent feed chute and subsequently into said mixing chamber; wherein said mixing chamber acts to blend said fibers and chemical agent before passage of said fibers and chemical agent into said fiber web forming chute.

* * * * *